(12) United States Patent
Zerah

(10) Patent No.: US 8,075,678 B1
(45) Date of Patent: Dec. 13, 2011

(54) PORTABLE WATER EXTRACTING AND PURIFICATION SYSTEM AND ASSOCIATED METHOD

(76) Inventor: Jerome Rene Zerah, Los Angeles, CA (US)

( * ) Notice: Subject to any disclaimer, the term of this patent is extended or adjusted under 35 U.S.C. 154(b) by 435 days.

(21) Appl. No.: 12/378,354

(22) Filed: Feb. 13, 2009

Related U.S. Application Data

(60) Provisional application No. 61/065,864, filed on Feb. 19, 2008.

(51) Int. Cl.
*B01D 50/00* (2006.01)
(52) U.S. Cl. .......................................... 96/417; 55/490.1
(58) Field of Classification Search .................... 95/273, 95/288; 55/490, 490.1; 96/417
See application file for complete search history.

(56) References Cited

U.S. PATENT DOCUMENTS 5,301,516 A * 4/1994 Poindexter ...................... 62/126

* cited by examiner

*Primary Examiner* — Robert A Hopkins

(57) ABSTRACT

A portable water extracting and purification system for converting filtered ambient air moisture into water may include a free-standing support frame and a reservoir removably engaged to the support frame and provided with a handle. The system may further include a mechanism for filtering ambient air prior to entering the support frame. Additionally, a mechanism may be included for extracting moisture from the filtered ambient air by inducing condensation to form and deposit water into the reservoir. An additional mechanism may be included for automatically toggling the moisture extracting mechanism between operating and non-operating modes upon detecting first and second triggering events respectively.

8 Claims, 7 Drawing Sheets

PORTABLE WATER EXTRACTING AND PURIFICATION SYSTEM AND ASSOCIATED METHOD

CROSS REFERENCE TO RELATED APPLICATIONS

This application claims the benefit of U.S. Provisional application No. 61/065,864, filed Feb. 19, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to water purification systems and, more particularly, to a portable water extracting and purification system for converting filtered ambient air moisture into water.

2. Prior Art

Americans tend to take for granted that their drinking water is safe. Indeed, about 80 percent of the country draws from public water systems that are tested and treated under strict regulations of the federal Safe Drinking Water Act. People who get their water from private wells or from small water systems, however, cannot always be certain about its quality because of changing environmental conditions and possible pollution. The quality of water varies around the United States; water may contain traces of contaminants, from heavy metals to microbial pathogens such as bacteria, parasites and viruses. About half of the drinking water in the United States comes from surface sources such as lakes, and the other half, from underground sources or aquifers.

Unfortunately, each has different risks for contamination. Surface water becomes contaminated more easily by factors such as agricultural runoff or sewage overflow during heavy rains. Groundwater, long a reliable source, has become increasingly contaminated by problems such as leaking underground gasoline storage tanks, malfunctioning or leaking septic tanks and industrial pollution that leaks into the ground. More recently, some farms have been linked to groundwater pollution because of vast amounts of animal wastes. Landfills also can be a source of contamination when pollutants leach into the ground. Even with the country's diligent water treatment efforts, environmental experts agree that the possibility of drinking tainted water, remote as it is, always exists.

Accordingly, a need remains for a water purification system in order to overcome the above-noted shortcomings. The present invention satisfies such a need by providing a system that is convenient and easy to use, is lightweight yet durable in design, and may be utilized to convert filtered ambient air moisture into water.

BRIEF SUMMARY OF THE INVENTION

In view of the foregoing background, it is therefore an object of the present invention to provide an apparatus for converting filtered ambient air moisture into water. These and other objects, features, and advantages of the invention are provided by a portable water extracting and purification system.

A portable water extracting and purification system for converting filtered ambient air moisture into water may include a free-standing support frame and a reservoir removably engaged to the support frame and provided with a handle. The system may further include a mechanism for filtering ambient air prior to entering the support frame, Additionally, a mechanism may be included for extracting moisture from the filtered ambient air by inducing condensation to form and deposit water into the reservoir. An additional mechanism may be included for automatically toggling the moisture extracting mechanism between operating and non-operating modes upon detecting first and second triggering events respectively.

The ambient air filtering mechanism may further include a chamber formed at a top end of the support frame and an opening formed at a top end of the chamber. In addition, the air filtering mechanism may include an air filter removably positioned at the opening of the chamber. In this manner, air-borne debris may be prohibited from entering the chamber as ambient air ingresses the chamber through the air filter.

The moisture extracting mechanism may additionally include a plurality of temperature regulating coils statically seated within the chamber. Also, the mechanism may include a catch pan situated within the chamber and disposed subjacent to the temperature regulating coils. Such a catch pan may be arranged in such a manner that the water may be received directly from the condensation coils and thereafter downwardly directed along a converging path towards the reservoir. Additionally, the moisture extracting mechanism may include a discharge outlet formed at a bottom region of the converging path and in fluid communication with the reservoir. The discharge outlet may thereby channel and deposit the water into the reservoir. Further, a power source may be in selective communication with the moisture extracting mechanism for selectively supplying power thereto when the triggering event is not detected.

The automatic toggling mechanism may further include a manually-actuated operating switch electrically coupled to the power source for manually toggling the moisture extracting mechanism between the operating and non-operating modes respectively. In addition, the automatic toggling mechanism further may include a seal extending along a bottom surface of the chamber and directly abutted against a top opening of the reservoir when the reservoir is positioned directly beneath the chamber. Further, a locking mechanism may be included and pivotally coupled directly to the chamber. Such a locking mechanism may be selectively engaged with the reservoir in such a manner that a top opening of the reservoir may be frictionally urged against the seal to thereby prohibit condensation from escaping out of the reservoir.

The locking mechanism may additionally include a notch formed within the support frame and a latching cam preferably having an anterior edge extending outwardly from the notch. Further, the locking mechanism may include a spring member preferably having axially opposed ends directly anchored to a posterior edge of the latching arm and a rear wall of the notch respectively. The locking mechanism may also include a protruding lip extending outwardly from an anterior face of the reservoir and a shoulder formed at a bottom end of the latch cam. In operation, the shoulder may be selectively engaged and disengaged to the protruding lip when the latching cam is at equilibrium and non-equilibrium positions respectively. Additionally, the equilibrium and non-equilibrium positions may be defined when the spring member is at equilibrium and compressed positions respectively. The first triggering event may be defined when the spring member is at equilibrium.

The locking mechanism further may include a first sensor and a switch electrically coupled to the first sensor and the power source respectively. In this manner, the first sensor may generate and transmit a first control signal to the switch upon detecting the first triggering event such that the switch may be automatically adapted to an open position to interrupt power to the moisture extracting mechanism.

The automatic toggling mechanism further may include a second sensor communicatively linked to the reservoir and the moisture extracting mechanism respectively. In addition, a second switch may be electrically coupled to each of the toggle and first switches respectively. The second sensor may generate and transmit a second signal to the moisture extracting mechanism when a fluid level in the reservoir is above a maximum threshold fluid level. In this manner, the moisture extracting mechanism may be automatically adapted to the non-operating mode.

The present invention may additionally include a method for converting filtered ambient air moisture into water. Such a method may include the chronological steps of first providing a free-standing support frame. Second the method may include the step of providing and removably engaging a reservoir to the support frame. The reservoir may be provided with a handle. Next, the method may include filtering ambient air prior to entering the support frame. Fourthly, the method may entail extracting moisture from the filtered ambient air by inducing condensation to form and deposit water into the reservoir. Finally, the method may include automatically toggling the fourth step between operating and non-operating modes upon detecting first and second triggering events respectively.

This affordable system would provide users with a simple and effective means of producing purified water for drinking and other purposes. Producing a copious amount of purified drinking water in very little time, usage of this water purification system could provide families with an endless amount of water that could last for years. As such, this handy system would eliminate the need to drink tap water, which could be loaded with contaminants, or bottled water that is unregulated and contain additives. In addition, the cost efficient system would alleviate the pressure on the family budget, eradicating the need to purchase cases of bottled water every week.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
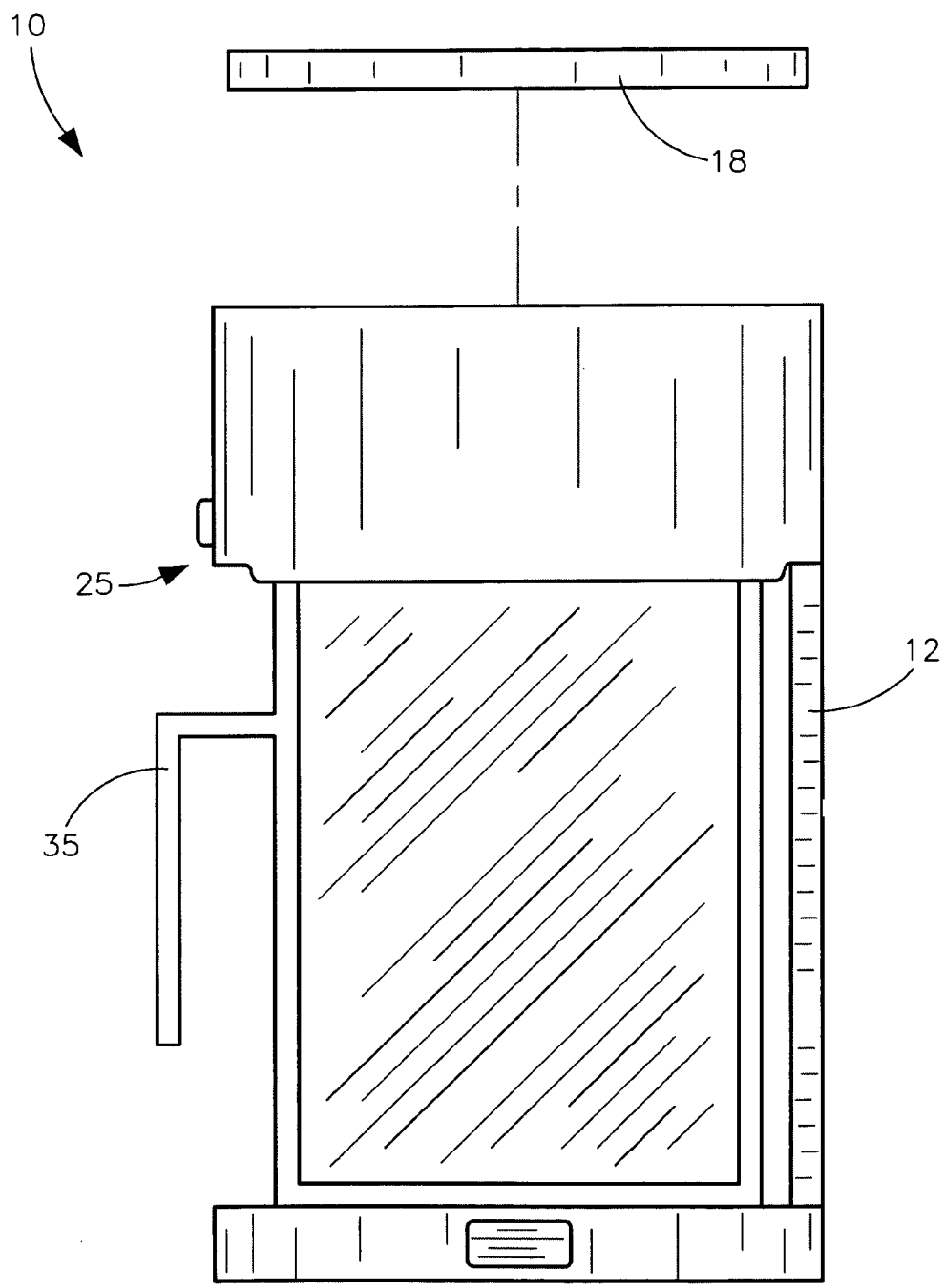
FIG. 1 is a perspective view showing a side elevational view of a portable water extracting and purification system, in accordance with the present invention.
Figure 2:
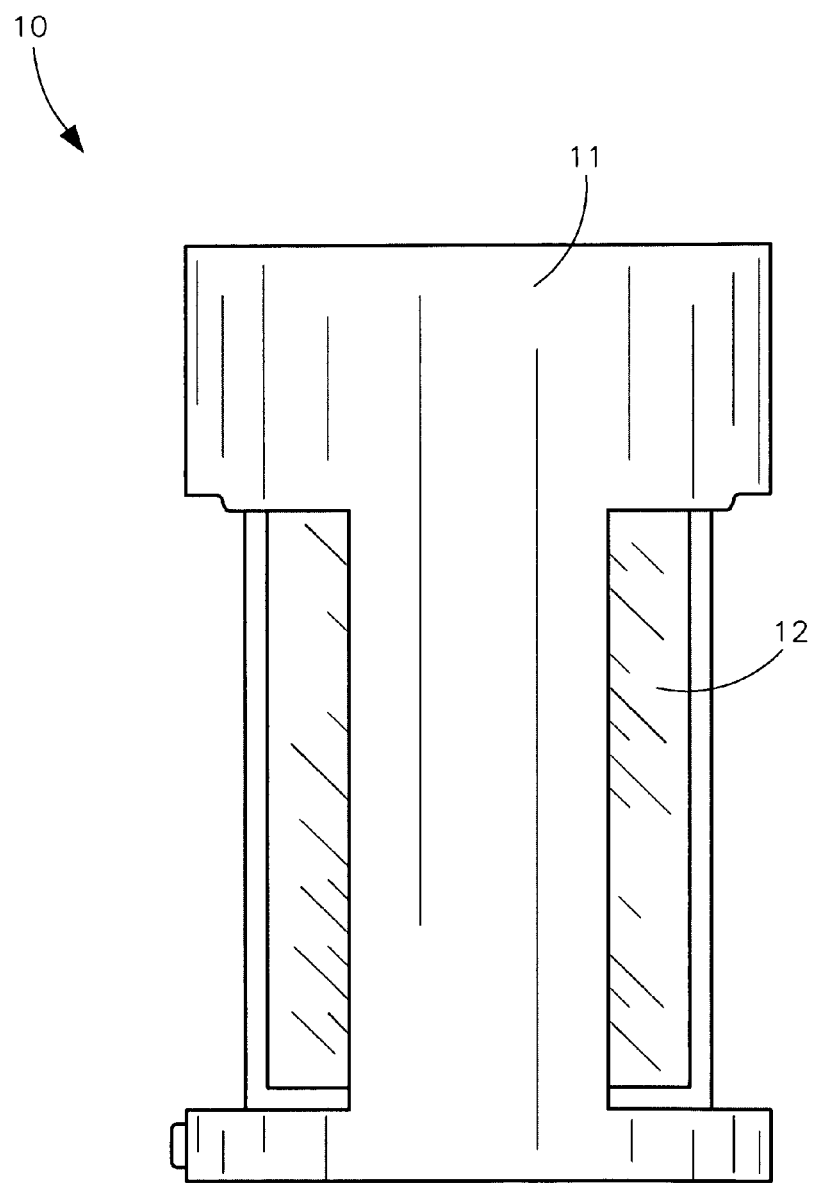
FIG. 2 is a rear elevational view of the apparatus shown in FIG. 1.
Figure 3:
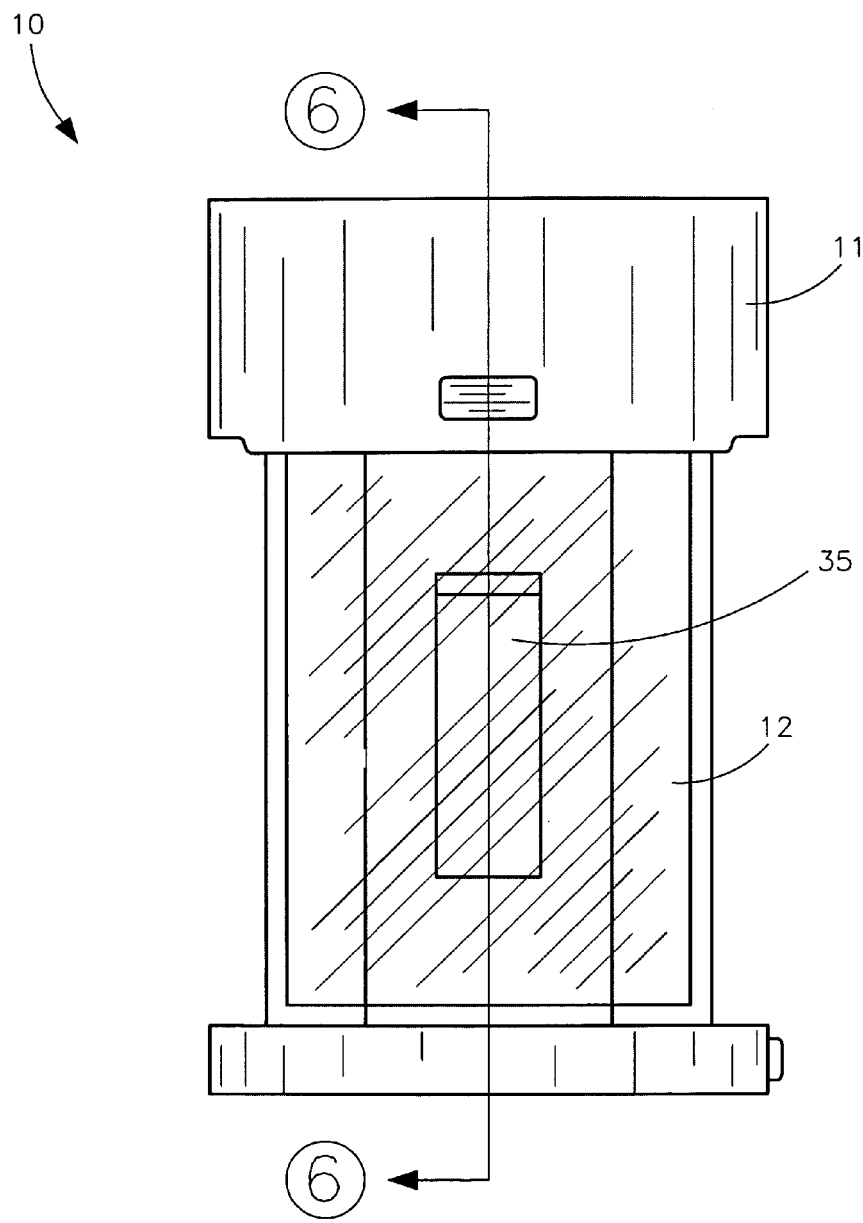
FIG. 3 is a front elevational view of the apparatus shown in FIG. 1.
Figure 4:
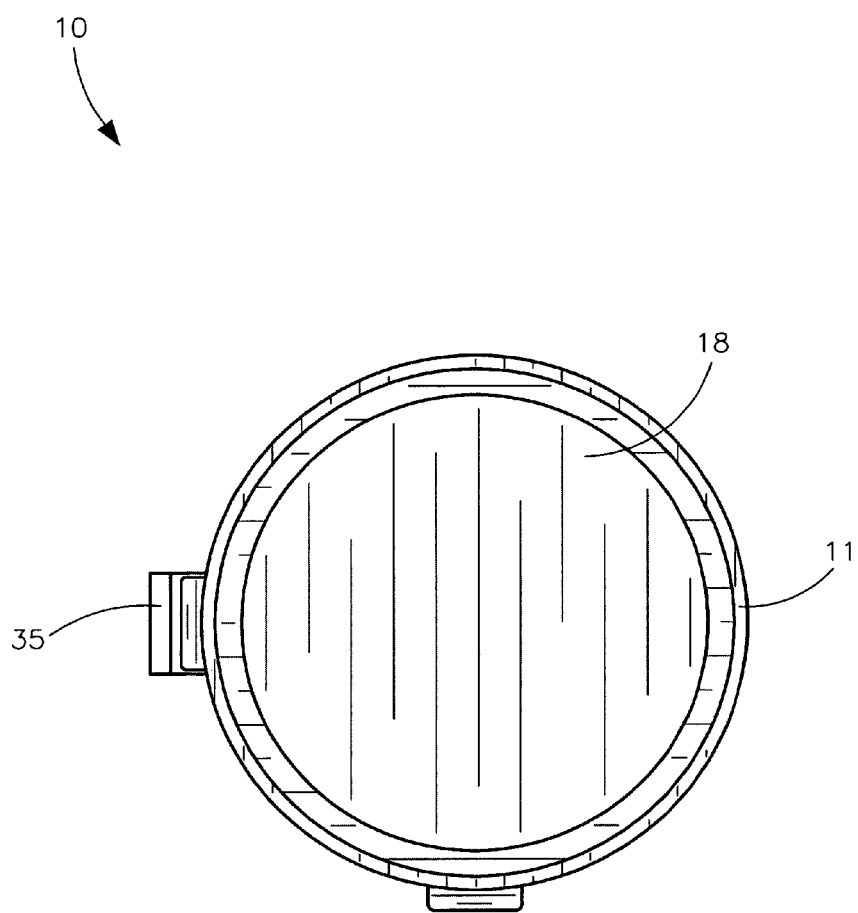
FIG. 4 is a top plan view of the apparatus shown in FIG. 1.
Figure 5A:
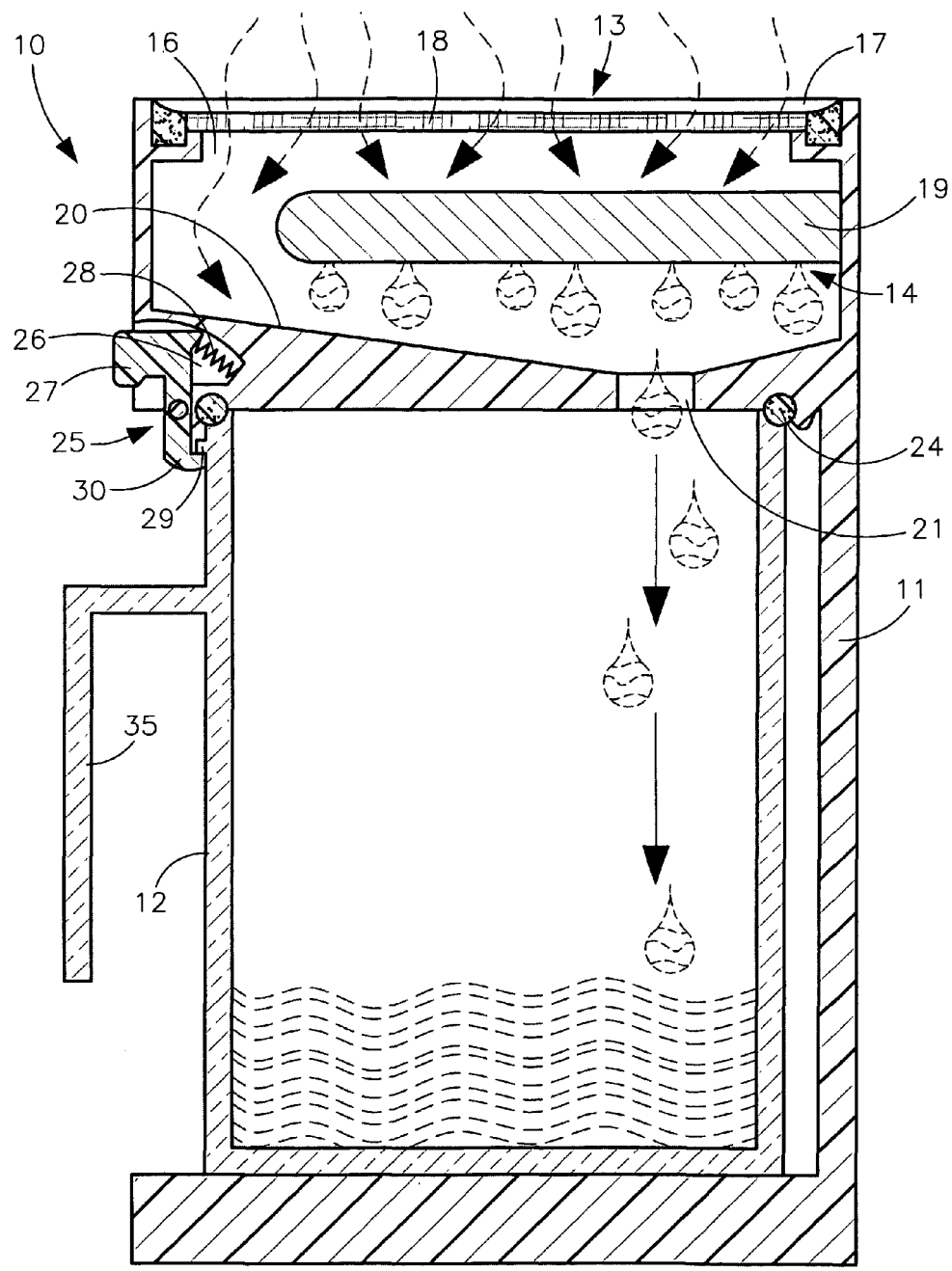
FIG. 5a is a cross-sectional view taken along line 5-5 in FIG. 3.
Figure 5B:
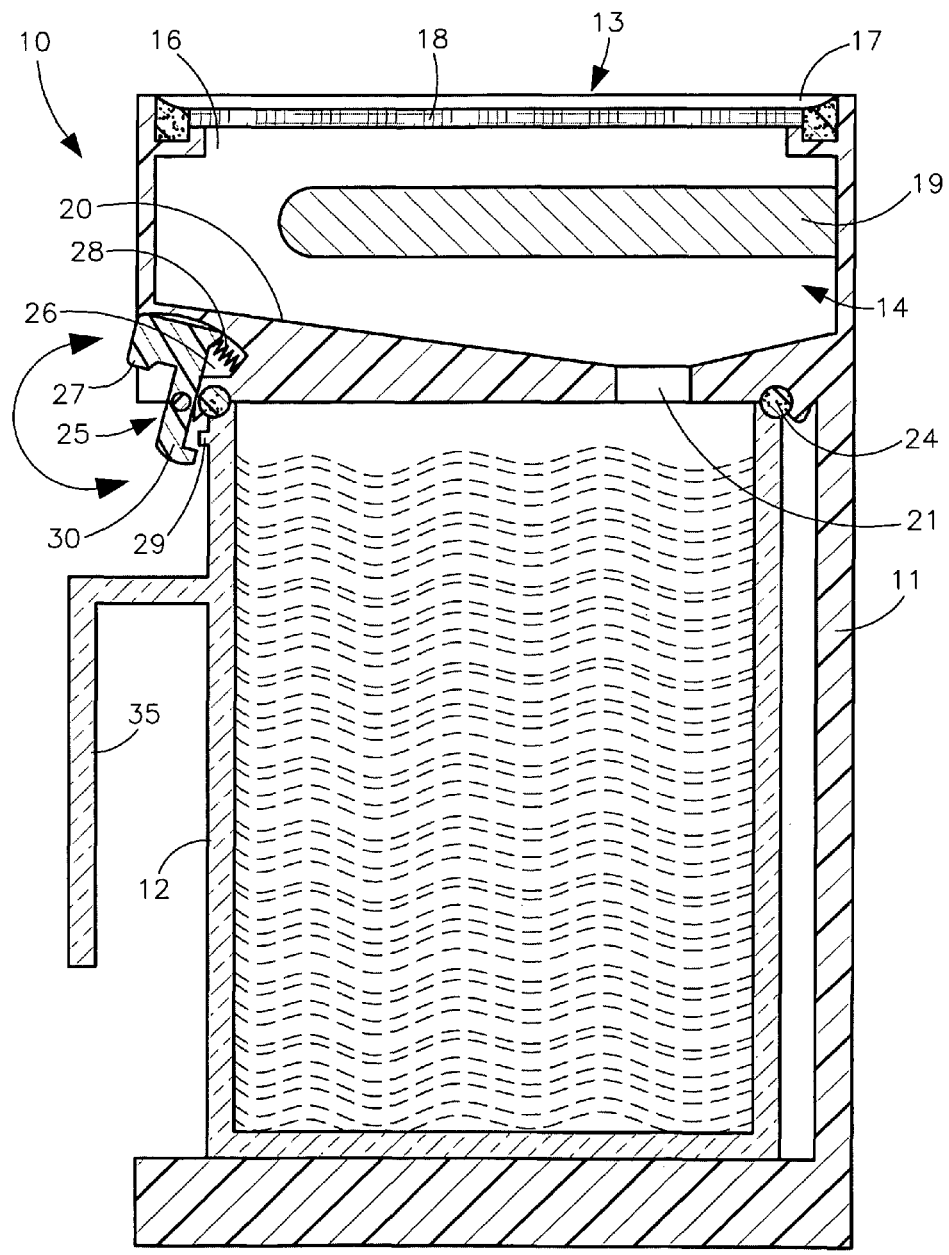
FIG. 5b is a cross-sectional view showing the latching mechanism and precipitation of water being deposited into the reservoir.
Figure 6:
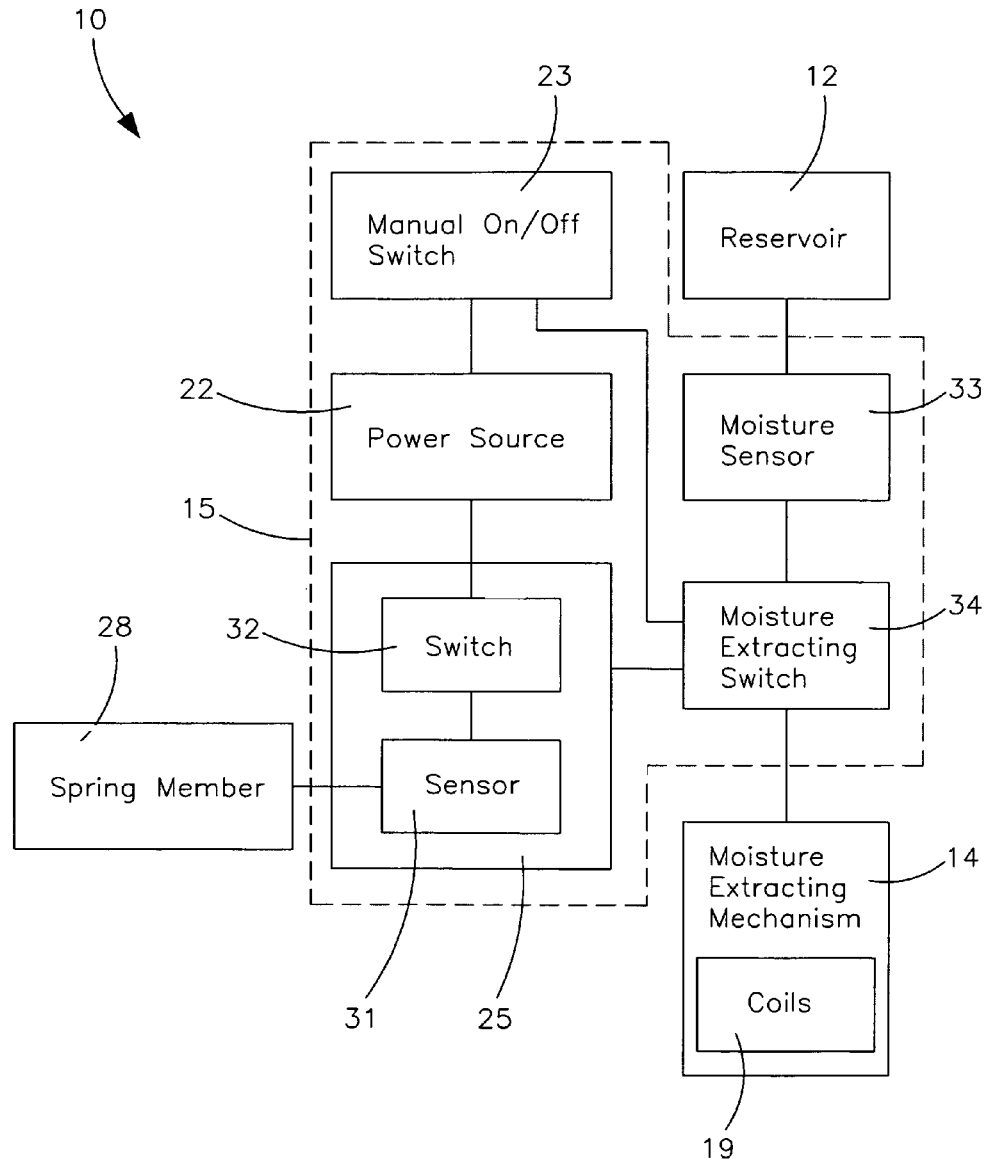
FIG. 6 is a schematic block diagram showing the interrelationship between the major electronic components of the present invention.

The system 10 of this invention is referred to generally in FIGS. 1-6 by the reference numeral 10 and is intended to provide a portable water extracting and purification system 10. It should be understood that the portable water extracting and purification system 10 may be used to convert filtered ambient air moisture into water in many different applications, including personal residences or offices, and should not be limited to the applications disclosed herein.

A portable water extracting and purification system 10 for converting filtered ambient air moisture into water may include a free-standing support frame 11 and a reservoir 12 removably engaged to the support frame 11 and provided with a handle 35. The system 10 may further include a mechanism 13 for filtering ambient air prior to entering the support frame 11.

Additionally, a mechanism 14 may be included for extracting moisture from the filtered ambient air by inducing condensation to form and deposit water into the reservoir 12. An additional mechanism 15 may be included for automatically toggling the moisture extracting mechanism 14 between operating and non-operating modes upon detecting first and second triggering events respectively.

The ambient air filtering mechanism 13 may further include a chamber 16 formed at a top end of the support frame 11 and an opening 17 formed at a top end of the chamber 16. In addition, the air filtering mechanism 13 may include an air filter 18 removably positioned at the opening 17 of the chamber 16. In this manner, air-borne debris may be prohibited from entering the chamber 16 as ambient air ingresses the chamber 16 through the air filter 18.

The moisture extracting mechanism 14 may additionally include a plurality of temperature regulating coils 19 statically seated within the chamber 16. Also, the mechanism 14 may include a catch pan 20 situated within the chamber 16 and disposed subjacent to the temperature regulating coils 19. Such a catch pan 20 may be arranged in such a manner that the water may be received directly from the condensation coils 19 and thereafter downwardly directed along a converging path towards the reservoir 12.

Additionally, the moisture extracting mechanism 14 may include a discharge outlet 21 formed at a bottom region of the converging path and in fluid communication with the reservoir 12. The discharge outlet 21 may thereby channel and deposit the water into the reservoir 12. Further, a power source 22 may be in selective communication with the moisture extracting mechanism 14 for selectively supplying power thereto when the triggering event is not detected.

The automatic toggling mechanism 15 may further include a manually-actuated operating switch 23 electrically coupled to the power source 22 for manually toggling the moisture extracting mechanism 14 between the operating and non-operating modes respectively. In addition, the automatic toggling mechanism 15 further may include a seal 24 extending along a bottom surface of the chamber 16 and directly abutted against a top opening 17 of the reservoir 12 when the reservoir 12 is positioned directly beneath the chamber 16.

Further, a locking mechanism 25 may be included and pivotally coupled directly to the chamber 16. Such a locking mechanism 25 may be selectively engaged with the reservoir 12 in such a manner that a top opening 17 of the reservoir 12 may be frictionally urged against the seal 24 to thereby prohibit condensation from escaping out of the reservoir 12.

The locking mechanism 25 may additionally include a notch 26 formed within the support frame 11 and a latching cam 27 preferably having an anterior edge extending outwardly from the notch 26. Further, the locking mechanism 25 may include a spring member 28 preferably having axially opposed ends directly anchored to a posterior edge of the latching cam 27 and a rear wall of the notch 26 respectively. The locking mechanism 25 may also include a protruding lip 29 extending outwardly from an anterior face of the reservoir 12 and a shoulder 30 formed at a bottom end of the latch cam 27.

In operation, the shoulder 30 may be selectively engaged and disengaged to the protruding lip 29 when the latching cam 27 is at equilibrium and non-equilibrium positions respectively. Additionally, the equilibrium and non-equilibrium positions may be defined when the spring member 28 is at equilibrium and compressed positions respectively. The first triggering event may be defined when the spring member 28 is at equilibrium.

The locking mechanism 25 further may include a first sensor 31, and a switch 32 electrically coupled to the first sensor 31 and the power source 22, respectively. In this manner, the first sensor 31 may generate and transmit a first control signal to the switch 32 upon detecting the first triggering event such that the switch 32 may be automatically adapted to an open position to interrupt power to the moisture extracting mechanism 14.

The automatic toggling mechanism 15 further may include a second sensor 33 communicatively linked to the reservoir 12 and the moisture extracting mechanism 14 respectively. In addition, a second switch 34 may be electrically coupled to each of the toggle 23 and first 32 switches respectively. The second sensor 33 may generate and transmit a second signal to the moisture extracting mechanism 14 when a fluid level in the reservoir 12 is above a maximum threshold fluid level. In this manner, the moisture extracting mechanism 14 may be automatically adapted to the non-operating mode.

The present invention may additionally include a method for converting filtered ambient air moisture into water. Such a method may include the chronological steps of first providing a free-standing support frame 11. Second the method may include the step of providing and removably engaging a reservoir 12 to the support frame 11. The reservoir 12 may be provided with a handle. Next, the method may include filtering ambient air prior to entering the support frame 11. Fourthly, the method may entail extracting moisture from the filtered ambient air by inducing condensation to form and deposit water into the reservoir 12. Finally, the method may include automatically toggling the fourth step between operating and non-operating modes upon detecting first and second triggering events respectively.

Referring to the figures in general, the water purification system 10 includes a portable, electronic device, which may be offered in a thermos-sized unit. An operating switch 23 (On/Off switch) is selectively toggled between active and inactive modes for transmitting power to the system 10. A flat air filter 18 may be disposed at the top of the support frame 11. Thus, the air filter 18 may draw air into a moisture chamber 16, where one or more smooth, cylindrical coils 19 may maintain a constant, fixed cold temperature just below zero, where the condensation forms and drips down into a catch pan 20. This catch pan 20 may be positioned at an angle, allowing the water droplets to fall directly into an attached cup or pitcher (referred to as reservoir 12). Such a reservoir 12 is preferably locked into place by a locking mechanism 25 cooperating with seal 24 to maintain an airtight environment and prevent evaporation.

In one embodiment, switch 32 communicates with locking mechanism 25 when simultaneously extend/retract a spring member 28 in communication with a sensor 31. Sensor 33 is also provided to determine when the reservoir 12 is full, which will automatically shut off the unit to prevent overflow.

When the present invention 10 is manually turned off via switch 23, the user may wait approximately one minute for the water to completely drain, at which time the reservoir 12 is filled with fresh, distilled water. This water can be consumed directly, or employed for cooking, or for making tea, coffee, or even ice cubes, just to name a few of the many possibilities. Power to the water purification system 10 would be provided by standard 110 volts, 60 hertz electricity and plugged into a standard power outlet.

In one embodiment, the present invention 10 may include an internal, rechargeable power source 22, such as nickel cadmium or nickel metal hydride, to facilitate use while traveling.

The locking mechanism 25 and switches 23, 32 and 34 communicatively control the operating mode of the system 10 by initially verifying whether the reservoir is in an authorized position. For example, when the locking mechanism 25 is in the closed position and switches 23, 34 are in the respective on positions, power is freely transmitted to the moisture extracting mechanism 14. Notably, the locking mechanism 25 may simultaneously extend or retract cam 27 and spring member 28, when toggled between locked and unlocked positions, respectively, for notifying sensor 31 when latching mechanism 25 is locked or unlocked respectively.

Another embodiment of the water purification system 10 may include heating coils 19 to help enhance/accelerate the humidity level within the moisture chamber 16 and, in conjunction with the standard cold coils 19, will be regulated by an electronically controlled thermostat that will determine the ambient weather conditions (i.e. temperature and humidity surrounding the unit) and make the proper internal temperature adjustments within the moisture chamber 16 in order to optimize condensation (water) production in all possible climates and environments.

It should be noted that, even in dry climates, the tandem use of the cold and heated coils 19 are meant to create humid conditions within the moisture chamber 16 in order to produce the maximum amount of moisture (water) in such an arid environment.

In one embodiment, heated coils 19 may not be necessary, such as climates with high humidity. However, their use may help enhance/accelerate the water production process. Very cold to freezing climates will require a slightly more elaborate, yet specific system 10, which utilizes an electronically-controlled thermostat to heat the air filter 18 and internal components of the present system 10 and thereby prevent freezing temperatures from seizing water production. In addition, the base of the unit, where the reservoir 12 rests, may be provided with a heated plate to prevent accumulated water from freezing.

In one embodiment, the catch pan 20 and coils 19 may be detachable for periodic cleaning and maintenance purposes. One skilled in the art understands the detachable catch pan 20 may be made of plastic, stainless steel or other suitable materials for repeated use. Likewise, the detachable coils 19 may also be made of ceramic, stainless steel or other suitable material.

Of course, coils 19 of the water purification system 10 will be provided in a variety of shapes, sizes and number, as these variations may be needed to exhibit higher production of condensation (water) in larger-scale units. The coils 19 may be positioned at a downward (vertical) angle in larger units in increase production of water on a larger scale.

In one embodiment, the power cord preferably plugs into a bottom edge of support frame 11 to ensure the cord can be replaced, as well as to accommodate a separate solar power unit that can plug into the base.

In one embodiment, a fan may also be included with the system 10 to force air into a larger version of the system 10 unit to potentially increase water production. Larger units may vary in size in order to produce a greater quantity of water, and can range in size from that of a standard water heater to that of a corn/grain silo.

In one embodiment, a specialized salt air filter 18 may be provided for use of the present invention in coastal regions (i.e. sea shores, beaches, etc.), islands, ships at sea, oil rig platforms, etc., in order to maintain the purity of the distilled water manufactured by the unit.

Preexisting water towers and tanks, like those used in small towns and motion picture and television studios, etc., not only require an external water source, but a pump to fill these tanks. Retrofitted to accommodate a large-scale version of the water purification system's technology, these water towers and tanks will only require a power source from the city or town's power grid, or a solar power unit which would make it a virtually independent system. New versions of the water tower and tank systems could be made with the present invention 10 built therein.

Of course, alternate embodiments may employ additional purification techniques (i.e. charcoal filter, osmosis filter, etc.), which may be located between the catch pan 20 and the reservoir 12 for further water purification. Such alternate embodiments may include an enhanced air filter 18 where anomalous atmospheric conditions warrant (i.e. possible dust, various toxic atmospheres, chemical based fumes, or other airborne contaminants) to thoroughly filter the air and produce the cleanest possible water.

In yet another embodiment, the present invention 10 may employ a UV (ultraviolet) lamp that would irradiate the filtering air with UV light to sterilize airborne microbes, pathogens, etc. Again, this feature may be used in conjunction with the water filtration system 10, the enhanced air filter 18, or both.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable water extracting and purification system for converting filtered ambient air moisture into water, said portable water extracting and purification system comprising:
   a free-standing support frame;
   a reservoir removably engaged to said support frame;
   means for filtering ambient air prior to entering said support frame;
   means for extracting moisture from the filtered ambient air by inducing condensation to form and deposit water into said reservoir; and
   means for automatically toggling said moisture extracting means between operating and non-operating modes upon detecting first and second triggering events respectively;
   wherein said ambient air filtering means comprises:
   a chamber formed at a top end of said support frame;
   an opening formed at a top end of said chamber; and
   an air filter removably positioned at said opening of said chamber such that air-borne debris is prohibited from entering said chamber as ambient air ingresses said chamber through said air filter;
   wherein said moisture extracting means comprises:
   a plurality of temperature regulating coils statically seated within said chamber;
   a catch pan situated within said chamber and disposed subjacent to said temperature regulating coils, said catch pan being arranged in such a manner that the water is received directly from said condensation coils and thereafter downwardly directed along a converging path towards said reservoir; and
   a discharge outlet formed at a bottom region of said converging path and being in fluid communication with said reservoir to thereby channel and deposit the water into said reservoir;
   wherein said moisture extracting means further comprises a power source in selective communication with said moisture extracting means for selectively supplying power thereto when said triggering event is not detected;
   wherein said automatic toggling means comprises a manually-actuated operating switch electrically coupled to said power source for manually toggling said moisture extracting means between the operating and non-operating modes respectively;

wherein said automatic toggling means further comprises:
a seal extending along a bottom surface of said chamber and being directly abutted against a top opening of said reservoir when said reservoir is positioned directly beneath said chamber; and
a locking mechanism pivotally coupled directly to said chamber and being selectively engaged with said reservoir in such a manner that a top opening of said reservoir is frictionally urged against said seal to thereby prohibit condensation from escaping out of said reservoir.

2. The portable water-purification system of claim 1, wherein said locking mechanism comprises:
a notch formed within said support frame;
a latching cam having an anterior edge extending outwardly from said notch;
a spring member having axially opposed ends directly anchored to a posterior edge of said latching arm and a rear wall of said notch respectively;
a protruding lip extending outwardly from an anterior face of said reservoir; and
a shoulder formed at a bottom end of said latch cam;
wherein said shoulder is selectively engaged and disengaged to said protruding lip when said latching cam is at equilibrium and non-equilibrium positions respectively;
wherein said equilibrium and non-equilibrium positions are defined when said spring member is at equilibrium and compressed positions respectively, said first triggering event being defined when said spring member is at equilibrium.

3. The portable water-purification system of claim 2, wherein said locking mechanism further comprises:
a first sensor; and
a switch electrically coupled to said first sensor and said power source respectively;
wherein said first sensor generates and transmits a first control signal to said switch upon detecting said first triggering event such that said switch is automatically adapted to an open position and interrupts power to said moisture extracting means.

4. The portable water-purification system of claim 3, wherein said automatic toggling means further comprises:
a second sensor communicatively linked to said reservoir and said moisture extracting means respectively; and
a second switch electrically coupled to each of said toggle and first switches respectively;
said second sensor generating and transmitting a second signal to said moisture extracting means when a fluid level in said reservoir is above a maximum threshold fluid level such that said moisture extracting means is automatically adapted to the non-operating mode.

5. A portable water extracting and purification system for converting filtered ambient air moisture into water, said portable water extracting and purification system comprising:
a free-standing support frame;
a reservoir removably engaged to said support frame and being provided with a handle;
means for filtering ambient air prior to entering said support frame;
means for extracting moisture from the filtered ambient air by inducing condensation to form and deposit water into said reservoir; and
means for automatically toggling said moisture extracting means between operating and non-operating modes upon detecting first and second triggering events respectively;
wherein said ambient air filtering means comprises:
a chamber formed at a top end of said support frame;
an opening formed at a top end of said chamber; and
an air filter removably positioned at said opening of said chamber such that air-borne debris is prohibited from entering said chamber as ambient air ingresses said chamber through said air filter;
wherein said moisture extracting means comprises:
a plurality of temperature regulating coils statically seated within said chamber;
a catch pan situated within said chamber and disposed subjacent to said temperature regulating coils, said catch pan being arranged in such a manner that the water is received directly from said condensation coils and thereafter downwardly directed along a converging path towards said reservoir; and
a discharge outlet formed at a bottom region of said converging path and being in fluid communication with said reservoir to thereby channel and deposit the water into said reservoir;
wherein said moisture extracting means further comprises a power source in selective communication with said moisture extracting means for selectively supplying power thereto when said triggering event is not detected;
wherein said automatic toggling means comprises a manually-actuated operating switch electrically coupled to said power source for manually toggling said moisture extracting means between the operating and non-operating modes respectively;
wherein said automatic toggling means further comprises:
a seal extending along a bottom surface of said chamber and being directly abutted against a top opening of said reservoir when said reservoir is positioned directly beneath said chamber; and
a locking mechanism pivotally coupled directly to said chamber and being selectively engaged with said reservoir in such a manner that a top opening of said reservoir is frictionally urged against said seal to thereby prohibit condensation from escaping out of said reservoir.

6. The portable water-purification system of claim 5, wherein said locking mechanism comprises:
a notch formed within said support frame;
a latching cam having an anterior edge extending outwardly from said notch;
a spring member having axially opposed ends directly anchored to a posterior edge of said latching arm and a rear wall of said notch respectively;
a protruding lip extending outwardly from an anterior face of said reservoir; and
a shoulder formed at a bottom end of said latch cam;
wherein said shoulder is selectively engaged and disengaged to said protruding lip when said latching cam is at equilibrium and non-equilibrium positions respectively;
wherein said equilibrium and non-equilibrium positions are defined when said spring member is at equilibrium and compressed positions respectively, said first triggering event being defined when said spring member is at equilibrium.

7. The portable water-purification system of claim 6, wherein said locking mechanism further comprises:
a first sensor; and
a switch electrically coupled to said first sensor and said power source respectively;
wherein said first sensor generates and transmits a first control signal to said switch upon detecting said first triggering event such that said switch is automatically adapted to an open position and interrupts power to said moisture extracting means.

8. The portable water-purification system of claim 7, wherein said automatic toggling means further comprises:

a second sensor communicatively linked to said reservoir and said moisture extracting means respectively; and a second switch electrically coupled to each of said toggle and first switches respectively;

said second sensor generating and transmitting a second signal to said moisture extracting means when a fluid level in said reservoir is above a maximum threshold fluid level such that said moisture extracting means is automatically adapted to the non-operating mode.

\* \* \* \* \*